United States Patent [19]

Van Engelshoven

[11] Patent Number: 5,453,980
[45] Date of Patent: Sep. 26, 1995

[54] COMMUNICATION NETWORK AND COMPUTER NETWORK SERVER AND INTERFACE MODULES USED THEREIN

[75] Inventor: Robertus J. Van Engelshoven, WC The Hague, Netherlands

[73] Assignee: Alcatel N.V., Rijswijk, Netherlands

[21] Appl. No.: 297,239

[22] Filed: Aug. 29, 1994

[30] Foreign Application Priority Data

Sep. 8, 1993 [EP] European Pat. Off. .............. 93202620

[51] Int. Cl.$^6$ ........................... H04L 12/28; H04L 12/46; H04L 12/56
[52] U.S. Cl. .................... 370/60.1; 370/85.5; 370/85.13; 370/94.2
[58] Field of Search ........................ 370/60, 60.1, 85.1, 370/85.2, 85.4, 85.5, 85.13, 85.14, 91, 92, 93, 94.1, 94.2, 94.3, 110.1; 395/200

[56] References Cited

U.S. PATENT DOCUMENTS

| | | | |
|---|---|---|---|
| 5,042,029 | 8/1991 | Hayakawa | 370/94.1 |
| 5,182,748 | 1/1993 | Sakata et al. | 370/94.1 |
| 5,379,296 | 1/1995 | Johnson et al. | 370/85.13 |
| 5,400,329 | 3/1995 | Tokura et al. | 370/94.1 X |
| 5,400,335 | 3/1995 | Yamada | 370/94.1 |

FOREIGN PATENT DOCUMENTS 544975  6/1993  European Pat. Off. .

OTHER PUBLICATIONS

"Technology, Distributed Control and Performance of a Multipath Self–Routing Switch", M. Henrion et al., *XIV International Switching Symposium*, Yokohama, Japan, Oct 25–30, 1992, vol. 2, pp. 2–6.

"Hitting Warp Speed For Lans" by M. Clarkson, byte, vol. 18, No. 3, Mar. 1993, London, GB, pp. 123, 124, 126, 128.

"Temporary Overload in High Speed Backbone Networks" by M. Gumbold et al, IEEE Infocom, vol. 3, May 1992, New York, pp. 2280–2289.

"Flight of the Falcon" by J. LeBoudec et al, IEEE Communications Magazine, vol. 31, No. 2, Feb. 1993, New York pp. 50–56.

"Memory– and Channel–Sharing Techniques for Congestion Control in ATM Networks" by K. Eng. et al, IEEE Infocom, vol. 1, Apr. 1993, New York, pp. 266–273.

"On the Design of a High Performance ATM Metropolitan Area Network" by A. Baiocchi et al, International Telecommunications Symposium, Rio de Janeiro, Brazil, Sep. 3–6, 1990, pp. 503–508

*Primary Examiner*—Hassan Kizou
*Attorney, Agent, or Firm*—Ware, Fressola, Van Der Sluys & Adolphson

[57] ABSTRACT

A communication network (VCN) offering an ETHERNET service to a plurality of local terminals (ELT1, ELTN, TLT1, TLTN1-8), typically computers, is proposed. Flexibility and cost are enhanced with respect to existing ETHERNET networks by emulating an ETHERNET network towards the local terminals while pooling complex functions in a computer network server (LANS) connected to the backbone ATM network (BB). This is achieved by coupling the local terminals, preferably separately, to standard ETHERNET links (ELN, TL1, TLN1-8) and by terminating these links in interface modules (EIM1, EIMN, TIM1, TIMN) converting the ETHERNET frames from the local terminals in ATM packets destined for the central server which stores these packets in an input buffer (IB1-X) and performs the above complex functions, particularly also the transmission of these packets to appropriate ones of the interface modules. Buffer overflow is avoided by transmitting backpressure signals (BP1-X) to the interface modules so as to control them to halt transmission on the computer links. The present invention is particularly well suited for early deployment of ATM networks as their inherent high bitrate transmission capability is used to provide ETHERNET type services at a lower cost per terminal while employing standard access technology.

19 Claims, 2 Drawing Sheets

COMMUNICATION NETWORK AND COMPUTER NETWORK SERVER AND INTERFACE MODULES USED THEREIN

TECHNICAL FIELD

The present invention relates to a communication network including a plurality of computer network links each coupled to at least one local terminal accessing said link according to a standard media access protocol.

BACKGROUND OF THE INVENTION

Communication networks such as the subject one are well known in the computer communications field, the most widespread examples being the local and metropolitan area networks, LAN and MAN respectively, realized according to a family of IEEE standards commonly known as the family of IEEE 802 standards. The latter networks use a shared transmission medium for the transmission of data between the local terminals. The use of this shared transmission medium has to be arbitrated and the procedure used therefor, generally known as media access protocol MAC, forms the main part of the above standards and determines to a large extent the computer network link type to be used.

Although these known networks, developed separately from the public telecommunications network, are presently the best known solution for the specific problems associated with computer communications, it is widely appreciated that they are intrinsically expensive with regard to installation and maintenance costs. The above is all the more true if only a small number of local terminals use the network as then the network cost per terminal considerably increases due to the relatively large fixed costs associated with wiring, control and communication with remote terminals, i.e. terminals from outside the network, which has to be performed via a separate module known as bridge/router module. Large maintenance costs occur when a plurality of parallel networks called collision domains, each having their own fixed costs, are necessary in a same site due to limitations on the number of local terminals connected to a same network. Indeed, a change in network traffic conditions then often requires physically changing the wiring of these networks in order to obtain more suitable collision domains.

It can thus be seen that the above known computer networks while providing a good and, thanks to large sales figures, cheap access method for terminals tend to be rather expensive over-all due to their rather expensive wiring and network termination equipment, especially when communication between the local and remote terminals is needed, and due to their lack of flexibility once implemented. These drawbacks are most outspoken when a number of small and distributed clusters of terminals need to be interconnected and when a very large number of terminals in a same site need to be able to communicate not only with each other but also with remote terminals.

DISCLOSURE OF INVENTION

It thus emerges that a need exists for providing a network of the above type but which allows a reduction in the network costs while still using the established and popular access methods of the known networks, i.e. while retaining the computer network links, the media access protocols and the terminal-to-network interfaces common in present computer networks.

This object is achieved due to the fact that the communication network also includes a plurality of interface modules connected to said computer network links and to a computer network server via a backbone network, data being exchanged between said terminals and said server via said interface modules and said server storing data from said terminals in an input buffer, transmitting data to said terminals via said interface modules and transmitting backpressure signals to inhibiting means included in said interface modules so as to control the filling level of said buffer, said inhibiting means thereto halting transmission on said links in a way dependent upon said standard media access protocol.

In so doing a virtual computer network of a known type is emulated, e.g. a virtual LAN or MAN, since all local terminals may behave as if they were incorporated in such a network while, as results from the above, they are only indirectly coupled via the computer network server. This is achieved by first concentrating all traffic from the local terminals to the computer network server via the existing backbone network and then letting the server perform complex tasks such as bridging/routing in a pooled and thus cheaper way.

The transmission medium shared between the local terminals of the thus established virtual network now is the buffer of the computer network server and the invention can thus be appreciated in the fact that arbitration therefor, i.e. the avoidance of buffer overflow, can via backpressure signals easily be converted in transmission inhibition in accordance with the standard media access protocol used on the computer network links. Such conversion is possible for every media access protocol since such a buffer may memorize data allowing it to compensate for the delays incurred by the data before arriving at the server as will be explained in further detail later.

It can thus be seen that the above object is met as the virtual computer network may be supplied at a lesser cost per terminal than feasible with known technology. Indeed, the costs of the server and interface modules is considerably smaller than the interconnection costs incurred by fully wiring all local terminals with computer network links or by partitioning them in collision domains terminating in a bridge module before using the existing backbone network for interconnection of these bridge modules.

The advantages of the present invention become even clearer when one considers that in using a buffer as a shared medium no generic limitation on the number of local terminals exists as with a cable since such a buffer, unlike a cable, can memorize a theoretically indefinite amount of data. Wiring from the terminals to the interface modules is furthermore straightforward and no need arises to change this wiring to obtain optimal performance.

A characteristic feature of the present invention is that data is transmitted over said backbone network according to the asynchronous transfer mode principle.

As a result, the network is from an evolutionary perspective well suited to handle high bitrate data present in computer networks as it exploits the generic ability of Asynchronous Transfer Mode or ATM backbone networks to handle such data while allowing present access equipment adapted to the transmission of such data to remain in place. The present invention is hence well suited for early deployment of ATM networks as their inherent high bitrate transmission ability is used to provide local area network services at lower costs per terminal while employing standard access technology.

Another characteristic feature of the invention is that a plurality of distinct standard media access protocols are used for exchanging data between said local terminals and said computer network links.

In this way, the fact that the local terminals are no longer directly coupled is further exploited. Indeed, the latter allows the use of distinct media access protocols in the same network since each local terminal communicates in a direct way only with the server which is independent from the media access protocol used as all data arrives there in a uniform backbone format. Concretely, the above feature thus allows the integration in the single virtual computer network of for instance both ETHERNET and TOKEN RING technology, i.e. terminals and computer links according to both standards.

A further object of the invention is to provide a computer network server to be used in the above communication network.

This object is achieved by a server which includes at least one server module which includes a said input buffer buffering data input to said server by said interface modules, an address filter deriving from said data the identities of appropriate ones of said interface modules and transmission means transmitting said data to said appropriate interface modules.

A characteristic feature of the server is that said at least one server module further includes flow control means monitoring the filling level of said input buffer and sending said backpressure signals if said filling level exceeds a predetermined threshold value.

The threshold value is needed for correct operation of the present network in view of the delays incurred by data sent by a local terminal before being buffered in the shared transmission medium which is the input buffer. Indeed, since collision on this shared medium between data units from the local terminals is tantamount to buffer overflow and since at the moment such collision is signalled to the local terminals a number of data units may still be underway, the threshold must be available to take into account the above delay and the amount of data potentially sent within this delay in order to avoid buffer overflow. This delay is composed of the delay incurred by data from the local terminal to the server and the delay with which backpressure signals have the effect of halting the transmission of the local terminals.

As mentioned above such delays may be accomodated in the present network thanks to the memory capacity of the shared medium which allows backlog in signalling overflow or collision.

Another characteristic feature of the server is that said flow control means sends said backpressure signals to selected ones of said interface modules only.

In so doing the generic flexibility of the present network is used to improve its performance beyond that of known networks as the selective halting of the transmission of some local terminals was impossible therein. This selectivity allows penalizing only those local terminals which transmit an excessive amount of data thus achieving a fairer access for all terminals and also avoiding unsatisfactory behaviour of the network in the presence of such unfair local terminals.

Still another characteristic feature of the server is that it further includes a bridge module to handle local-to-remote and remote-to-local data destined for and received from remote terminals not connected to any of said interface modules respectively, said local-to-remote data being forwarded to said bridge module by said address filter to be further forwarded, after extraction of the identity of a destination remote terminal, to an associated backbone network address and said remote-to-local data being directly supplied to said computer network server via said bridge module and being converted thereby for storage in said input buffer.

It can thus be seen that the earlier mentioned and particularly costly bridge/router may in the present network simply be pooled thus reducing the over-all network cost.

Although, as explained earlier, the present network allows integration of a vary large number of terminals within the same virtual computer network the need may still arise to provide a number of collision domains. When, for instance, a server with a specific limited capacity is already in place it might be useful to upgrade its capacity and therefore also the number of local terminals connected to it. Also state of the art technology might limit the number of local terminals which are handled by a server module as described above, it thus being necessary for sites with more local terminals to provide collision domains. Such limitations might further be necessary to improve the throughput of a server module of the above type.

With regard to the above a very important feature of the present server is that it includes a plurality of said server modules as well as input switch means having an input coupled to the input of said server and a plurality of outputs each coupled to one of said server modules, data supplied to the input of said server by said interface modules being routed by said input switch means to a selected one of said server modules dependent on the identity of said interface module sending said data, said interface modules thereby being divided by said input switch means into a plurality of collision domains each of which is served by a distinct one of said server modules.

Thus the above requirements are met in a simple way because a plurality of server modules can be so coupled in parallel, each of these server modules being associated to one such collision domain. This is achieved without severely complicating the design of the server since, in addition to the further server modules, only a simple input switch means is required to make the appropriate Selections. This server can by its parallel and modular nature be easily customized to suit particular requirements concerning number of local terminals and throughput.

Another important feature of the present server is that said collision domains and said associated server modules are defined in a configuration table included in said input switch means, said server including reconfiguration means adapted to change said table.

It can be seen that in providing the possibility of defining collision domains the present network remains very flexible. Indeed, in contrast to the known networks having collision domains, only a software operation, i.e. adapting the configuration table, is needed to tune the network to the changing traffic characteristics.

Still a further object of the present invention is to provide an interface module which can be used in the above communication network.

This object is achieved through an interface module which comprises format conversion means for converting data from a format used by said computer network link connected thereto, to a format used by said backbone network and vice versa, said inhibiting means inhibiting transmission on said computer network link in response to said backpressure signals and in a way dependent upon said media access protocol, and data acknowledge means for transmitting a data acknowledge signal to said computer network server pursuant to correct transmission of data received therefrom on said computer network link.

Specific embodiments of this interface module are that said media access protocol used on said computer network link is the ETHERNET protocol and that said inhibiting means converts said backpressure signals into dummy frames with Ethernet adresses different from the addresses of the local terminals coupled to said interface module, and that said media access protocol used on said computer network link is the TOKEN RING protocol and that said inhibiting means converts said backpressure signals by withholding a token from said local terminals connected thereto.

It can be seen from the above two examples that it is very simple to adapt the interface modules to a multitude of access technologies, the above examples only being those most important.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
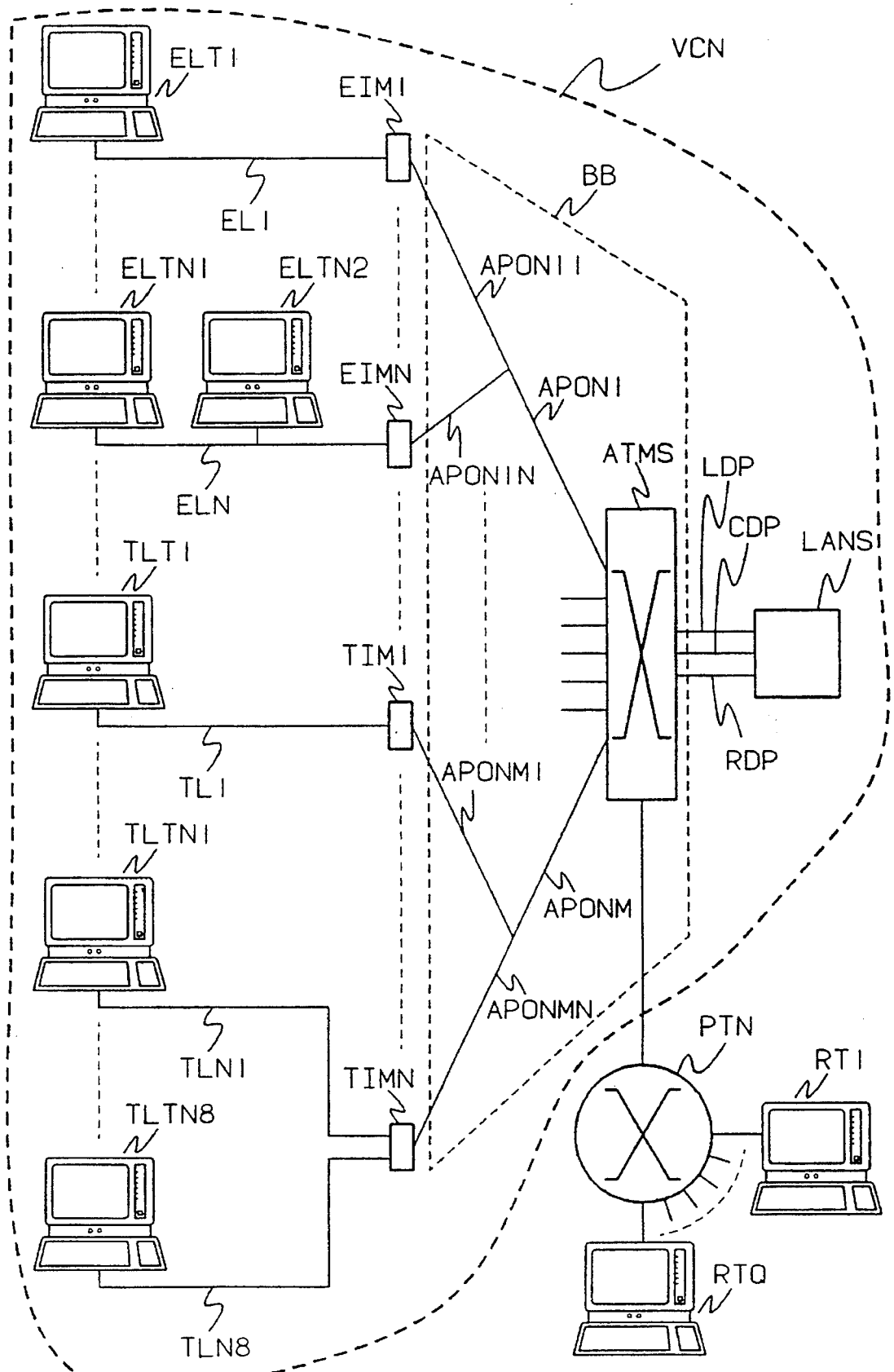
FIG. 1 shows a communication network VCN according to the present invention and its interconnection via a public telecommunication network PTN with remote terminals RT1-Q; and, FIG. 2 schematically depicts a computer network server LANS according to the invention and used in the above communication network of FIG. 1.

The communication network VCN shown in FIG. 1 is a computer or data network used in an office, e.g. an hospital, or in a residential area. It includes local terminals ELT1, ELTN1-2, TLT1, TLTN1-8 which communicate with each other indirectly via a backbone network BB and a computer network server LANS and is therefore called virtual computer network. The server LANS is called a local area network server since, as described in detail hereinbelow, the virtual network thus emulates a local area network towards the local terminals, in the present embodiment the thus emulated local area network being either an ETHERNET or a TOKEN RING network. The local terminals ELT1, ELTN1-2, TLT1 and TLTN1-8 may further also communicate with remote terminals RT1-Q, not included in the virtual computer network VCN, over a public telecommunication network PTN which is also coupled to the backbone network BB.

The local terminals ELT1, ELTN1-2, TLT1 TLN1-Q are subdivided in two groups according to the type of local area network to which they are adapted to have access. Terminals ELT1, ELTN1-2 are for instance adapted to have access to an ETHERNET network and they are therefore connected to ETHERNET computer links, EL1 and EL2 respectively, whilst terminals TLT1, TLTN1-Q are adapted to have access to a TOKEN RING network and are therefore connected to TOKEN RING computer links, TL1 and TL1-8 respectively. Since both the local terminals and the computer network links to which they are connected thus correspond to well known technology, they are hereafter not described in detail and their properties are used throughout this description as forming part of the common general knowledge of a person skilled in the art.

To be noted that although each computer network link is normally coupled to one local terminal, special cases are allowed for clusters of terminals. Local terminals ELTN1 and ELTN2 form such a cluster and are connected to a same computer link ELN without further ado as they so form a known ETHERNET network for which they were designed in the first place. The measures required for the virtual network VCN to take these special cases into account are described later.

The computer links EL1, ELN, TL1 and the bundle of links TLN1-8 are each coupled to the interface modules, EIM1, EIMN and TIM1 to TIMN respectively. The latter modules are in their turn each coupled to a backbone network link APON11, APON1N, APONM1 and APONMN respectively. The backbone network links APON11 and APON1N form part of an asynchronous transfer mode passive optical network with a common optical link APON1 coupled to a port of an asynchronous transfer mode switch ATMS forming part of the backbone network BB. Likewise, APONM1 and APONMN form part of a further asynchronous transfer mode passive optical network now with a common optical link APONM also coupled to a port of ATMS. The backbone network BB can thus be composed of up to M passive optical network, each of them consisting of up to N backbone network links. It can thus be clearly seen that a large number of local terminals may be so integrated in the present virtual computer network VCN.

Regarding the operation of the backbone network BB no further details need be given since they can be readily obtained from the published European Patent Application EP-A1-0544975 corresponding to U.S. patent application Ser. No. 07/983,876 filed Dec. 1, 1992, now U.S. Pat. No. 5,353,285, for the passive optical network and from the article "Technology, distributed control and performance of a multipath self-routing switch", by M. A. Henrion et al., International Switching Symposium, October 1992, Yokohama, Vol. 2, pp. 2–6 for the asynchonous switch ATMS. With regard to the present network VCN it is however important to note that the interface modules EIM1, EIM2, TIM1 and TIMN may form part of subscriber units as disclosed in the former document wherein also interface modules, called line interface modules, for voice and video traffic are present. In this way the present virtual network VCN service blends in seamlessly with other services provided on the backbone network BB, each subscriber of the latter network having the option to complete its subscriber unit with an interface module for the virtual network VCN.

The above described backbone network BB is either a PABX for office use or an access network to the public telecommunication network PTN for residential subscribers. In the latter case the subscribers may acquire high performance data services without having to commonly set up a local area network. Indeed, it suffices for a public operator to provide the local area network server LANS on one of the ports of the switch ATMS.

With reference to FIG. 1, it can be further seen that the mentioned local area network server LANS is coupled to the switch ATMS via a local data link LDP via which this server exchanges data with the local terminals ELT1, ELTN1-2, TLT1, TLTN1-8, via a control data link CDP over which data acknowledge signals from the interface modules EIM1, EIMN, TIM1, TIMN are received and via a remote data link RDP via which data is exchanged with the remote terminals RT1-Q coupled to the switch ATMS via the public telecommunication network PTN as already mentioned above.

Finally with reference to FIG. 1, the operation of the interface modules EIM1, EIMN, TIM1, TIMN is explained in more detail hereafter.

The interface modules mainly perform a format conversion between the format in which data is received from the computer links EL1, ELN, TL1, TLN1-8, i.e. an ETHERNET or TOKEN RING frame format, to a format compatible with the backbone network BB, i.e. an ATM cell format, and vice versa. This format conversion need not be described in further detail since a device realizing this conversion can be designed by a person skilled in the art without difficulty in using known transceivers on either side of the interface module and in considering the mentioned frame and cell formats which are well known. The only special feature of this format conversion device is the fact that in converting ETHERNET or TOKEN RING frames into ATM cells, it always has to assign the backbone network address of the local data link LDP, or a virtual connection or path identifier indicative thereof, to the address portion of the ATM cells thus concentrating all data traffic from the local terminals to the server LANS.

Apart from the above two further functions need to be provided by the interface modules, i.e. the conversion of backpressure signals issued by the local area network server LANS in order to avoid buffer overflow therein and sending of data acknowledge signals to this server LANS so as to signal thereto the succesful transmission of a data unit. Both these functions are hereafter discussed in detail with respect to the interface modules, their implication on the operation of the local area network server LANS and the virtual computer network VCN being explained further below after discussing the architecture of the server with reference to FIG. 2.

The conversion of backpressure signals issued by the local area network server LANS has as its purpose the halting of signal transmission by the local terminals coupled to the interface modules receiving these signals. Such conversion is therefore dependent on the type of the local terminals which are so targetted. Indeed, each of these terminals gain access to the computer link to which they are connected via a media access protocol also called MAC which is distinct for each type of local area network and denying such access therefore also depends on this MAC.

For the local terminals ELT1, ELTN1-2 the ETHERNET MAC halts transmission of new frames when collision between a frame sent thereby and another frame send on the ETHERNET link EL1 and EL2 respectively is detected. The interface modules EIM1, EIM2 therefore continuously sent dummy frames on the links EL1 and ELN upon the receipt of backpressure signals thereby avoiding that the local terminals ELT1 and ELTN1-2 respectively continue to succesfully transmit frames. These dummy frames are such that the ETHERNET address they carry is different of that of any of the local terminals coupled thereto because otherwise these terminals would handle the data in these dummy frames which is obviously not called for.

On the other hand for the local terminals TLT1, TLTN1-2 the TOKEN RING MAC only allows them to gain access and hence to start transmission if a token which is passed through the ring comes in their possession (in this respect it is to be noted that the TOKEN RING links TL1, TLN1-8 are not to be viewed as a single connection but rather as two separate cables respectively from/to the local terminal to/from the interface module thus establishing the mentioned ring). In normal operation this token is passed between the terminal and the interface module. However, upon receipt of backpressure signals this token is continuously withheld by the interface module without it transmitting data.

The transmission of data acknowledge signals by the interface modules EIM1, EIMN, TIM1, TIMN is needed because the server LANS cannot on beforehand know if an incident frame transmitted by it will collide with a frame issued by the terminals ELT1, ELTN1-2, TLT1, TLTN1-8 coupled to these interface modules. In case of such collision the interface module has to detect this in the same way as the local terminals do this in accordance with the appropriate MAC and attempt retransmission at a moment that is prescribed by this MAC. Since this would normally require memory capacity in the interface modules which increases the cost thereof, memorizing these colliding frames is avoided in the present network VCN by letting the interface modules send a negative data acknowledge signal to the server LANS which then centrally administers the retransmission. The latter is particularly advantageous since the interface module cost is of prime importance in the deployment of the virtual computer network VCN. Indeed, it is the cost at which for instance the residential subscribers may gain access to the network VCN.

Finally with reference to the interface modules, the special type of interface module TIMN is discussed in more detail. As can be seen from FIG. 1 this interface module TIMN is connected to a bundle of 8 TOKEN RING computer links TLN1-8 whereas the other interface modules EIM1, EIMN and TIM1 are only connected to a single computer link EL1, ELN and TL1 respectively. In spite of this difference TIMN has exactly the same functionality as the other interface modules and in fact it is the concatenation of 8 distinct interface modules wherein common hardware on the backbone network BB side is shared. This means more particularly that interface module TIMN additionally multiplexes/demultiplexes data from/to the local terminals TLTN1-8 in order to provide a more cost effective way of interconnecting a small cluster of local terminals to the present virtual computer network VCN. The above is clearly distinct from the situation which occurs with local terminals ELTN1-2 albeit that the same goal, i.e. reduction of the cost per local terminal, is obtained.

Figure 2:
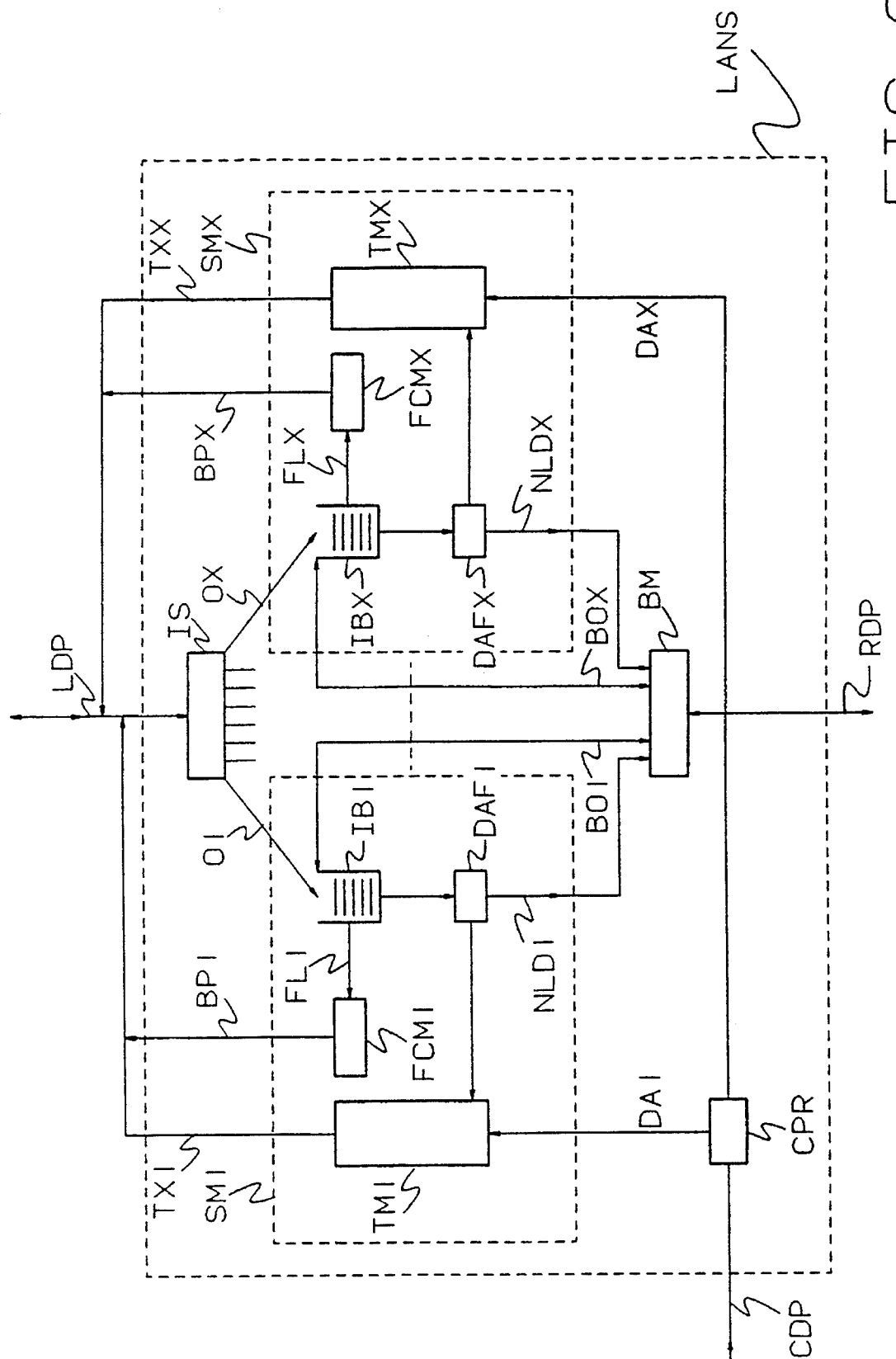

With reference to FIG. 2 the local area network server LANS is hereafter described in detail.

As mentioned above the server LANS has 3 distinct inputs LDP, CDP and RDP each connected to a distinct port of the switch ATMS. The input LDP is bidirectional for receiving data from the interface modules EIM1, EIMN, TIM1, TIMN and for transmitting data thereto respectively. The data received via LDP is applied to an input switch IS having a plurality of outputs O1-X each coupled to a distinct server module SM1-X. The input switch includes a configuration table (not shown) defining collision domains each comprising a number of interface modules e.g. EIMN, TIMN and EIM1, TIM1 and also assigning these collision domains to one of the server modules SM1-X. The input switch IS further includes a selection circuit (not shown) which forwards received data to an appropriate one of the outputs O1-X dependent upon its originating interface module and the above table.

As can be seen from FIG. 2 each server module SM1-X has a like structure consisting of an input buffer IB1-X in which data provided by the input switch IS at a corresponding one of its outputs O1-X is buffered, a destination address filter DAF1-X reading data from the corresponding input buffer at a constant rate determined by an internal clock signal (not shown) and deriving the destination of this data therefrom, and a transmission circuit TM1-X to which data is forwarded by the address filter DAF1-X when this data is destined for one of the interface modules within the same collision domain. Each server module SM1-X further includes a flow control module FCM1-X monitoring the filling level FL1-X of a corresponding input buffer IB1-X and generating backpressure signals BP1-X when this filling level FL1-X exceeds a predetermined threshold value.

As shown schematically in FIG. 2, the backpressure signals BP1-X are multiplexed together with the data sent by the transmission circuits TM1-X on the local data link LDP. In order for this data to be transmitted to the appropriate interface module(s), the destination address filters DAF1-X before forwarding the data to the corresponding transmission circuits TM1-X, rearrange the address parts of the cells handled by it so as to denote the backbone network address of this destination interface module, or the virtual connection or path indicative thereof, and copies these cells while adapting the destination address when the cells have to be sent to multiple interface modules.

The destination address filter DAF1-X can detect data which is not destined for any of the interface modules included in its associated collision domain and forwards such data via a corresponding non-local data connection NLD1-X to a bridge module BM included in the local area network server LANS which handles this data as will be described in detail later on. A final function of the destination address filters DAF1-X is needed when a situation as with local terminals ELTN1-2 occurs, i.e. when a number of local terminals form together with the interface module, in the present case EIMN, a local area network of a known type. In this case the filter DAF1-X also detects data which is transmitted by one of these local terminals ELTN1-2 to another one thereof and eliminates this data in order to avoid that these terminals receive the same data twice. This function is performed by the server LANS rather than by the interface module EIMN in order to keep the cost of this module low which is important for reasons already mentioned above.

Following is an explanation of the operation of the server modules SM1-X with respect to the already mentioned data acknowledge signals received via the control data link CDP. These data acknowledge signals CDP are received by a control processor CPR included in the server LANS which demultiplexes these data acknowledge signals in much the same way as the input switch IS demultiplexes the data received via LDP, i.e. dependent upon the interface module which issued the data acknowledge signals, CPR forwards them to one of the server modules SM1-X assigned to a collision domain including this interface module. To this end it has a plurality of data acknowledge outputs DA1-X each coupled to a corresponding one of the transmission circuits TM1-X.

With respect to the latter circuits TM1-X it must now be noted that they consist of a memory part (not shown) and a memory control part (not shown) and that they store the cells which have to be transmitted to the interface modules prior to transmission in the mentioned memory part. The memory control part then reads the data out of this memory part for transmission but this data remains stored in the memory part until the memory control part receives from the control processor CPR via the corresponding data acknowledge output DA1-X a data acknowledge signal relative to this data. Upon receipt of the latter signal the data which is so acknowledged is deleted from the memory part. If such a data acknowledge signal is not received in a predetermined time interval it is retransmitted by the memory control part according to a retransmission procedure, for instance the one used in ETHERNET networks. If possible the retransmission procedure used is the one of the local area network to which the local terminals to which the data has to be transmitted is adapted.

Finally, to complete the description of the operation of the local area network server LANS the mentioned bridge module BM and its interconnections are now described in more detail. This bridge module receives data from both the already mentioned non-local data lines NLD1-X of the server modules SM1-X and the bidirectional remote data link RDP. All data received is checked for the address of the destination terminal and output to the remote data link RDP if this destination terminal is one of the remote terminals RT1-Q. The bridge module BM then assures that the destination address part of the cells which are so forwarded is adapted to the backbone network address with respect to the public telecommunications network PTN of this remote destination terminal RT1-Q.

On the other hand, for data destined for one or more of the local terminals ELT1, ELTN1-2, TLT1, TLTN1-8, the bridge module BM detects to which collision domain the destination local terminal is assigned and it forwards this data via one of its outputs BO1-X to the corresponding server module SM1-X and more particularly to the input buffer IB1-X thereof. In this way all remote incoming data and all local data exchanged between distinct collision domains is handled automatically.

It is finally to be noted that a person skilled in the art may design a local area network server LANS having only one server module without difficulty from the above description. Indeed, this entails only the omission of the input switch and the corresponding simplification of the bridge module BM and the control processor CPR.

While the principles of the invention have been described above in connection with specific apparatus, it is to be clearly understood that this description is made only by way of example and not as a limitation on the scope of the invention.

I claim:

1. Communication network including a plurality of computer network links (EL1, ELN, TL1, TLN1-8) each coupled to at least one local terminal (ELT1, ELTN, TLT1, TLTN1-8) accessing said link according to a standard media access protocol wherein it also includes a plurality of interface modules (EIM1, EIMN, TIM1, TIMN) connected to said computer network links (EL1, ELN, TL1, TLN1-8) and to a computer network server (LANS) via a backbone network (BB), data being exchanged between said terminals (ELT1, ELTN, TLT1, TLTN1-8) and said server via said interface modules and said server storing data from said terminals in an input buffer (IB1-X), transmitting data to said terminals via said interface modules and transmitting backpressure signals (BP1-X) to inhibiting means included in said interface modules so as to control filling level (FL1-X) of said input buffer, said inhibiting means thereto halting transmission on said links in a way dependent upon said standard media access protocol.

2. Communication network according to claim 1, wherein data is transmitted over said backbone network (BB) according to an asynchronous transfer mode principle.

3. Communication network according to claim 1, wherein a plurality of distinct standard media access protocols are used for exchanging data between said local terminals (ELT1, ELTN, TLT1, TLTN1-8) and said computer network links (EL1, ELN, TL1, TLN1-8).

4. Communication network according to claim 1, wherein said computer network server (LANS) includes at least one server module (SM1-X) which includes a said input buffer (IB1-X) for buffering data input to said server (LANS) by said interface modules (EIM1, EIMN, TIM1, TIMN), an address filter (DAF1-X) for deriving from said data the identities of appropriate ones of said interface modules and transmission means (TM1-X) for transmitting said data to said appropriate interface modules.

5. Communication network according to claim 4, wherein said at least one server module (SM1-X) of said computer network server (LANS) further includes flow control means (FCM1-X) for monitoring the filling level (FL1-X) of said input buffer (IB1-X) and for providing said backpressure signals (BP1-X) when said filling level exceeds a predetermined threshold value.

6. Communication network according to claim 5, wherein said flow control means (FCM1-X) of said computer network server (LANS) is for providing said backpressure signals (BP1-X) to selected ones of said interface modules (EIM1, EIMN, TIM1, TIMN) only.

7. Communication network according to claim 4, wherein said transmission means (TM1-X) of said computer network server (LANS) includes a data memory in which said data is stored prior to transmission to a said interface module and from which said data is removed only after a data acknowledge signal indicating successful transmission of said data on said computer network links (EL1, ELN, TL1, TLN1-8) is received from said interface modules (EIM1, EIMN, TIM1, TIMN), said transmission means periodically retransmitting said data until said data acknowledge signal is received.

8. Communication network according to claim 4, wherein said computer network server (LANS) further includes a bridge module (BM) to handle local-to-remote (NLD1-X) and remote-to-local (RDP) data destined for and received from remote terminals (RT1-Q) not connected to any of said interface modules (EIM1, EIMN, TIM1, TIMN) respectively, said local-to-remote data being forwarded to said bridge module by said address filter (DAF1-X) to be further forwarded, after extraction of the identity of a destination remote terminal, to an associated backbone network address and said remote-to-local data being directly supplied to said computer network server (LANS) via said bridge module and being converted thereby for storage in said input buffer (IB1-X).

9. Communication network according to claim 8, wherein said bridge module (BM) routes said remote-to-local data to the said input buffer (IB1-X) associated with said collision domain in which a destination local terminal for said local-to-remote data is included.

10. Communication network according to claim 8, wherein said address filter (DAF1-X) also forwards data for a destination local terminal not included in said associated collision domain to said bridge module (BM), said bridge module routing the latter data to the said input buffer (IB1-X) associated with said collision domain in which said destination local terminal is included.

11. Communication network according to claim 4 wherein said computer network server includes a plurality of said server modules (SM1-X) as well as input switch means (IS) having an input (LDP) coupled to a local data link input (LDP) of said server (LANS) and a plurality of outputs (O1-X) each coupled to one of said server modules, data supplied to the input of said server by said interface modules (EIM1, EIMN, TIM1, TIMN) being routed by said input switch means to a selected one of said server modules dependent on the identity of said interface module sending said data, said interface modules thereby being divided by said input switch means into a plurality of collision domains each of which is served by a distinct one of said server modules.

12. Communication network according to claim 11, wherein said collision domains and said associated server modules (SM1-X) are defined in a configuration table included in said input switch means (IS), said server including reconfiguration means adapted to change said table.

13. Communication network according to claim 11, wherein said bridge module (BM) routes said remote-to-local data to the said input buffer (IB1-X) associated with said collision domain in which a destination local terminal for said local-to-remote data is included.

14. Communication network according to claim 11, wherein said address filter (DAF1-X) also forwards data for a destination local terminal not included in said associated collision domain to said bridge module (BM), said bridge module routing the latter data to the said input buffer (IB1-X) associated with said collision domain in which said destination local terminal is included.

15. Communication network according to claim 1, wherein each of said interface modules (EIM1, EIMN, TIM1, TIMN) comprises format conversion means for converting data from a format used by a computer network link (EL1, ELN, TL1, TLN1-8) connected thereto, to a format used by said backbone network (BB) and vice versa, said inhibiting means inhibiting transmission on said computer network link in response to said backpressure signals (BP1-X) and in a way dependent upon said media access protocol, and data acknowledge means for transmitting a data acknowledge signal to said computer network server (LANS) pursuant to correct transmission of data received therefrom on said computer network link.

16. Communication network according to claim 15, wherein for at least one of said interface modules, (EIM1, EIMN, TIM1, TIMN) said media access protocol used on said computer network link (EL1, ELN, TL1, TLN1-8) is an Ethernet protocol, said inhibiting means for converting said backpressure signals into dummy frames with Ethernet addresses different from the addresses of the local terminals (ELT1, ELTN, TLT1, TLTN1-8) coupled to said at least one interface module.

17. Communication network according to claim 15, wherein for at least one of said interface modules, (EIM1, EIMN, TIM1, TIMN) said media access protocol used on said computer network link (EL1, ELN, TL1, TLN1-8) is a TOKEN RING protocol, said inhibiting means converting said backpressure signals by withholding a token from said local terminals (ELT1, ELTN, TLT1, TLTN1-8) connected thereto.

18. A communication network server, comprising:
at least one server module which includes an input buffer for buffering data provided to said server by at least one of a plurality of interface modules connected to the communication network server via a backbone network, wherein said communication network server further comprises an address filter for determining from said data identities of selected ones of said interface modules and further comprises transmission means for transmitting said data to said selected interface modules wherein a corresponding plurality of computer network links are coupled to said plurality of interface modules and wherein each of said plurality of computer network links is coupled to at least one local terminal accessing said link according to a selected media access protocol, wherein said data is exchanged between said terminals and said server via said interface modules and said backbone network, said server storing data from said terminals in said input buffer, transmitting data to said terminals via said interface modules and transmitting back pressure signals to inhibiting means included in said interface modules so as to control a filling level of said input buffer, said inhibiting means thereto halting transmission on said links according to said selected media access protocol.

19. An interface module for a communication network having a backbone network and a server connected to the backbone network, comprising:

format conversion means for converting data from a format used by a computer network link connected thereto to a format used by said backbone network and vice versa;

inhibiting means for inhibiting transmission on said computer network link in response to a back pressure signal from said server according to a media access protocol corresponding to said computer network link; and data acknowledge means for transmitting a data acknowledge signal to said computer network server pursuant to receipt of correct data from said server on said computer network link.

\* \* \* \* \*

UNITED STATES PATENT AND TRADEMARK OFFICE
CERTIFICATE OF CORRECTION

PATENT NO. : 5,453,980
DATED : September 26, 1995
INVENTOR(S) : R. Van Engelshoven It is certified that error appears in the above-indentified patent and that said Letters Patent is hereby corrected as shown below:

At column 10, line 59 (line 15 of claim 1), please insert --a-- between "control" and "filling".

Signed and Sealed this

Twelfth Day of December, 1995

Attest:

BRUCE LEHMAN

Attesting Officer

Commissioner of Patents and Trademarks